United States Patent Office 3,725,131
Patented Apr. 3, 1973

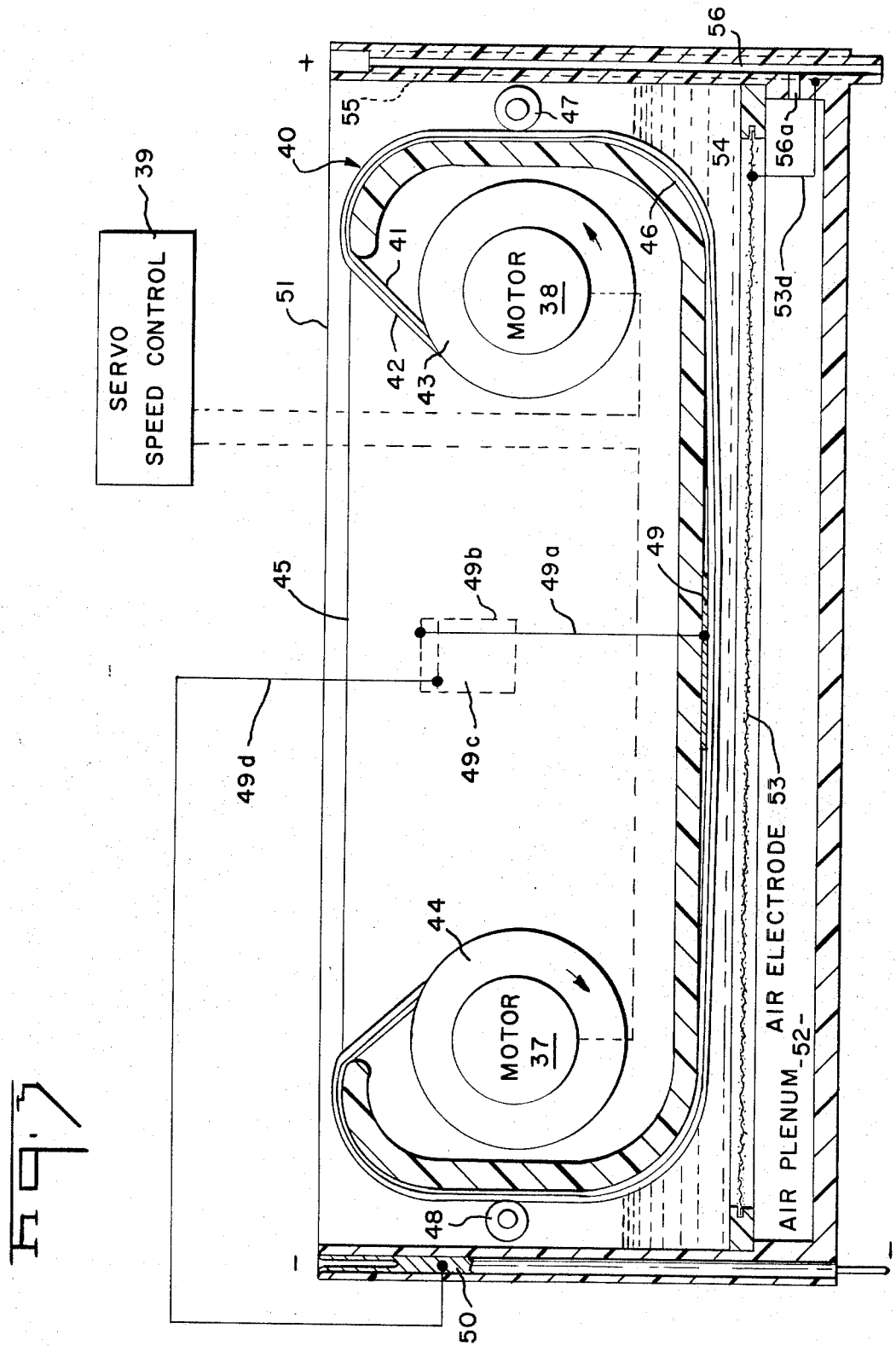

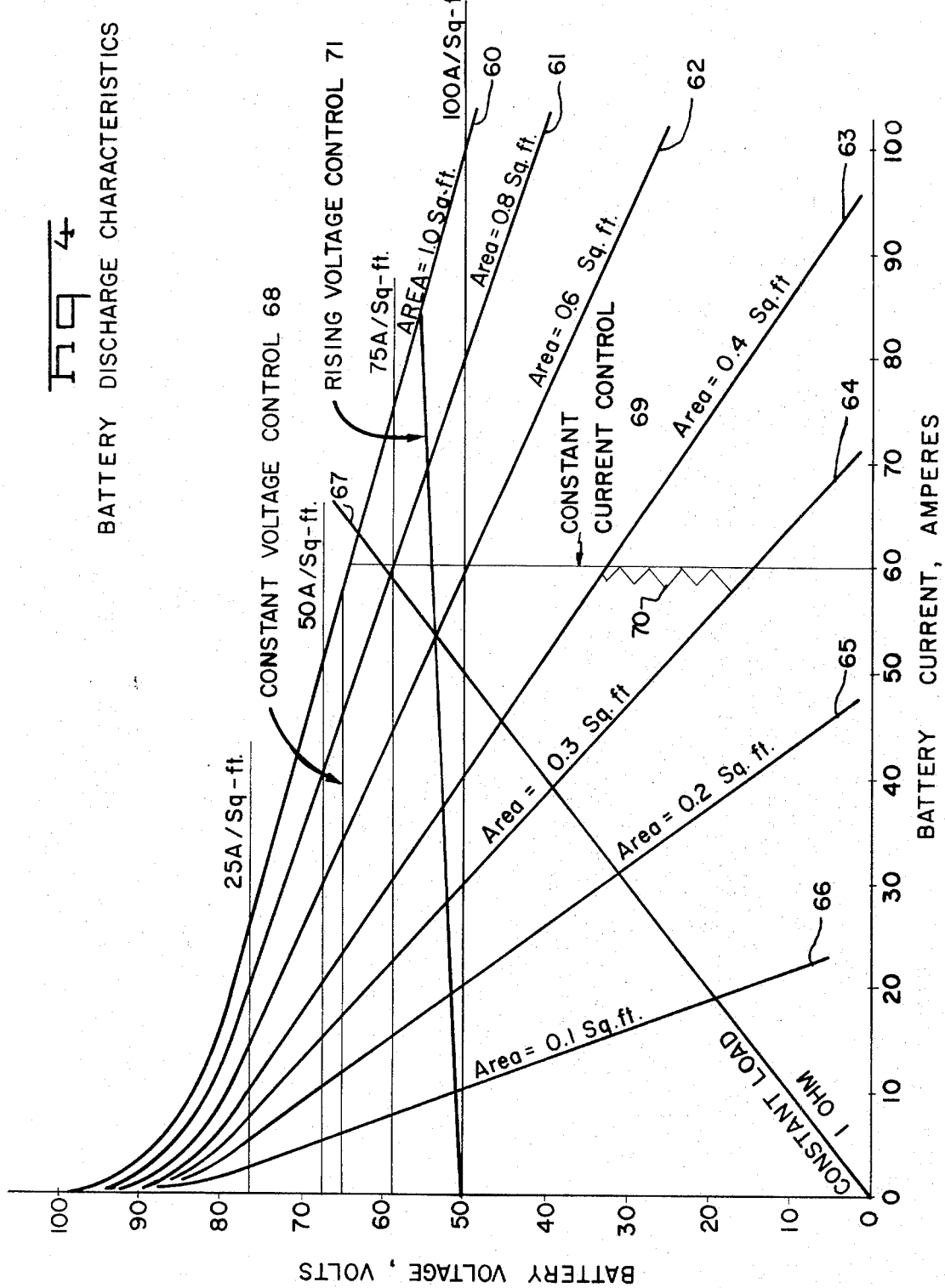

3,725,131
RECHARGEABLE MOVING TAPE CELL
Clifford Harold Pountney and Edward Francis Miller, Harrisburg, Pa., assignors to AMP Domestic Inc.
Original application Apr. 28, 1969, Ser. No. 819,548, now Patent No. 3,577,281, dated May 4, 1971. Divided and this application Sept. 30, 1970, Ser. No. 76,945
Int. Cl. H01m 27/00
U.S. Cl. 136—86 A          19 Claims

ABSTRACT OF THE DISCLOSURE

A rechargeable cell comprising, in a charged state, a bulk aqueous electrolyte of potassium hydroxide saturated with zinc oxide; a cathode; and an anode comprising a long steel tape coated with zinc on its active surface. The tape is driven from a storage reel through a region in the electrolyte adjacent to the cathode, and onto a takeup reel, at speeds dependent on the load current or voltage, or both. During charging, the tape is driven in the opposite direction. The cathode may be a stationary air permeable electrode; or it may comprise a tape similar to the anode tape and similarly driven, coated with silver oxide on its active surface.

---

This application is a division of application Ser. No. 819,548 filed Apr. 28, 1969, now U.S. Pat. 3,577,281.

BACKGROUND OF THE INVENTION

The need for secondary electric batteries having much greater energy storage capacities and substantially higher power outputs per unit weight and volume is becoming increasingly urgent. An important use for such batteries would be to supply the motive power in various types of vehicles now commonly driven by internal combustion engines, so as to reduce air pollution and possibly costs as well. The present invention provides rechargeable current generating cells that can be connected in series to provide such improved batteries.

SUMMARY OF THE INVENTION

A typical rechargeable current generating cell according to this invention comprises a bulk liquid electrolyte; a cathode, at least a portion of which is immersed in the electrolyte; an anode, at least a portion of which is immersed in the electrolyte and is positioned with its active surface opposite and closely spaced from the active surface of the cathode; the anode comprising a thin flexible movable elongated conductive member having a coating of electrochemically active material thereon; means for storing substantial lengths of the anode at locations away from the electrolyte; and means for moving portions of the anode into, through, and away from the electrolyte.

The cathode may comprise a stationary member, such as an air permeable conductive member, preferably having catalytic material thereon. Alternatively, the cathode may comprise a thin flexible movable elongated conductive member having a coating of electrochemically active material thereon.

Means may be provided for controlling the speed of movement of the anode (and of the cathode where the movable type is used), as by continuously adjusting the speed of movement so as to provide preselected voltages across, and currents through, the cell over a range of settings of a command device. Typical control means includes a servomechanism, and is responsive to the instantaneous voltage or current to maintain at least one of them substantially at values selected as a function thereof and of adjustable settings of the command device. The moving means drives the anode in one direction when the cell is being discharged and in the opposite direction when it is being charged.

In a typical cell, with the cell in a charged state, the electrolyte is alkaline, the active anode surface consists esesntially of iron, cadmium, or zinc, and the active cathode surface consists essentially of nickel oxide or silver oxide; more specifically, the electrolyte may consist essentially of potassium hydroxide, and the active anode surface and the active cathode surface respectively may consist essentially of iron versus nickel oxide; cadmium versus silver oxide; or zinc versus silver oxide. In an acid type cell, with the cell in a charged state, the electrolyte may consist essentially of sulfuric acid, the active anode surface may consist essentially of lead, and the active cathode surface may consist essentially of lead oxide.

In a preferred form of the cell, with the cell in a charged state, the active anode surface consists essentially of zinc, preferably as a coating of about 5 to 25 (typically 15) grams per square foot of zinc on a steel tape about 1 to 5 mils thick; and the electrolyte is an aqueous solution consisting essentially of about 30 to 45 percent potassium hydroxide saturated with zinc oxide. Where the movable type of cathode is used, the active cathode surface consists essentially of silver oxide, preferably as a coating of about 4 to 20 (typically 12) grams per square foot of silver oxide on a similar tape. Where the cathode is stationary, it preferably comprises a conductive screen having on it a catalyst comprising essentially platinum or silver.

BRIEF DESCRIPTION OF THE DRAWINGS

FIG. 3 is a vertical cross-sectional view of a cell of the type shown in FIG. 2.

FIG. 4 is a graph illustrating the operation of typical means for controlling the speed of the movable members in the cells of FIGS. 1–3.

DESCRIPTION OF THE PREFERRED EMBODIMENTS

Figure 1:
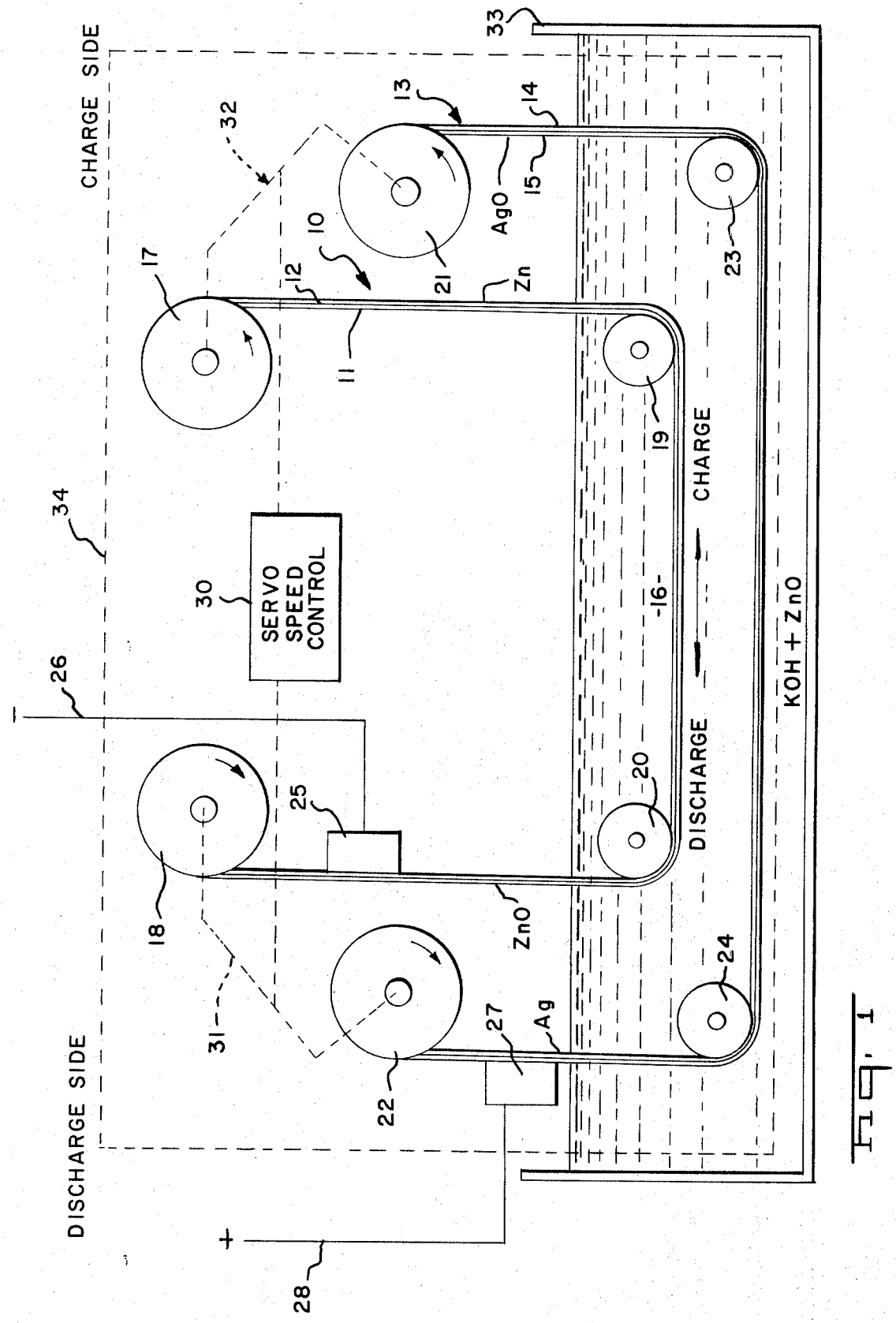
FIG. 1 is a diagrammatic vertical cross-sectional view of a typical rechargeable cell according to the present invention wherein both the anode and the cathode are in the form of movable tapes.

FIG. 1: Both electrodes movable

In FIG. 1 a typical rechargeable cell according to this invention includes a movable anode 10 comprising a flexible support tape 11 of conductive material, such as steel, and a thin film 12 of active material such as zinc, plated on the outer surface thereof; a movable cathode 13 comprising a similar support tape 14 having a thin film 15 of active material, such as silver oxide, plated on the inner surface thereof; and an aqueous electrolyte 16, which typically comprises potassium hydroxide and zinc oxide. The anode 10 is wound on storage reels 17 and 18, which may be driven in either direction selectively, as indicated at 31 and 32, by a motor or other suitable driving means (not shown), at speeds that are regulated by a servo speed control 30. The anode 10 is positioned in the electrolyte 16 by rollers 19 and 20. The cathode 13 is wound on storage reels 21 and 22, which also may be driven in either direction selectively, as indicated at 31 and 32, by the same motor or other suitable driving means (not shown), at speeds that are regulated by the servo speed control 30. The cathode 13 is positioned in the electrolyte 16 by rollers 23 and 24.

Electrical connection to the anode 10 is made through a brush 25, made of graphite or other suitable conductive material, which presses against the conductive supporting tape 11, and a negative lead wire 26 connected to the brush 25. Elecerical connection to the cathode 13 is made through a similar conductive brush 27, which presses against the conductive supporting tape 14, and a positive lead wire 28 connected to the brush 27. All components of the cell except the electrolyte 16 and its container 33 may be mounted in a housing 34, which should be open or perforated at the bottom. The housing 34 and its contents may be removed from the electrolyte 16 when the cell is not in use. The container 33 and the housing 34 may be made of plastic or other insulating material, as may also the reels 17, 18, 21, and 22, and the rollers 19, 20, 23, and 24.

Discharging, FIG. 1

In operation, fully charged electrode tapes 10 and 13 are stored on the reels 17 and 21. The reels 18 and 22 are driven clockwise to pull the tapes 10 and 13 downward from the reels 17 and 21 around the rollers 19, 20; 23, 24 and through the electrolyte 16 at speeds on the order of twelve inches per minute or less. A voltage is produced across the output leads 26 and 28. As current is drawn by a load (not shown) connected across the leads 26 and 28, the voltage tends to fall. The continuous movement of the tapes 10 and 13 providing fresh active materials 12 and 15 tends to make the voltage rise. By the time when portions of the tapes 10 and 13 reach the rollers 20 and 24, the zinc of the film 12 on such portions of the anode tape 10 will have been converted substantially to zinc oxide and the silver oxide of the film 15 on such portions of the cathode tape 13 will have been converted substantially to silver. The inactive materials, zinc oxide and silver, on their respective tapes 10 and 13 are stored on the reels 18 and 22 and are said to be in the discharged state.

The speed of the tapes is controlled by the servo speed control 30, as is indicated at 31, according to the load current being drawn and the output voltage, so that the cell remains intermediate between a fully charged state and a fully discharged state, and typically with the voltage maintained approximately at a selected useful working value. When all of the tape has been removed from the reels 17 and 21, the cell is substantially discharged.

Charging, FIG. 1

To charge the cell, the process is reversed by driving the reels 17 and 21 counterclockwise, as indicated at 32, to pull the discharged tapes 10 and 13 downward from the reels 18 and 22, around the rollers 20, 19; 24, 23, and up onto the reels 17 and 21. A source of direct voltage (not shown) is connected to the cell with the positive terminal of the voltage source connected to the positive lead 28 of the cell and with the negative terminal of the voltage source connected to the negative terminal 26 of the cell. The voltage provided by the external source must be greater than that generated within the cell so as to provide a charging current through the cell in the direction opposite to that of the current that passes through the cell when it is discharging. This reverse current converts the zinc oxide on the anode tape 10 back to zinc and converts the silver on the cathode tape 13 back to silver oxide. During charging the voltage across the cell is maintained between about 1.5 and 2 volts.

The speed at which the tapes are driven during charging is regulated by the servo speed control 30, which is responsive to the voltage across the cell and the current through it to provide the proper rate of charging so that the tapes 10 and 13 emerge from the electrolyte 16 with their active films 12 and 15 in the form of zinc and silver oxide, respectively. Thus when the charging process is completed, with all of the tape stored back on the reels 17 and 21, the cell is back in its original charged state.

During discharge, the zinc film 12 on the anode tape 10 undergoes the following simplified chemical reaction:

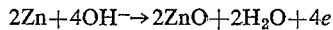

and the silver oxide film 15 on the cathode tape 13 undergoes the reaction:

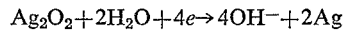

The hydroxyl ions formed at the cathode 15 migrate across the electrolyte 16 under the influence of the 4 electrons flowing out of the negative zinc anode 12 through the load and into the positive silver oxide cathode 15. On reaching the anode 12 these ions complete the current circuit and react with the zinc. The overall reaction is then:

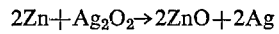

Thus the only reactants consumed are those supplied on the anode and cathode tapes. The electrolyte remains unchanged.

Of course the reaction at the zinc anode 12 uses the hydroxyl ions that are near to it in the electrolyte, while the new hydroxyl ions are created near to the silver oxide cathode 15. This leads to a depletion of hydroxyl ions near the anode 12 and an excess of ions near the cathode 15 within the electrolyte 16, causing the so-called concentration polarization and a loss of cell voltage. Since the motion of the tapes stirs up the electrolyte, and since the above reactions take place progressively all along the immersed areas of the tapes, concentration polarization is much less of a problem in this cell than in ordinary cells wherein the electrodes are stationary.

During charge, electrons are supplied where during discharge they were removed, and the reactions become:

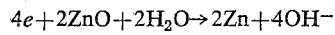

at the anode, and

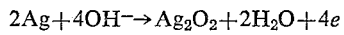

at the cathode. The overall reaction is reversed:

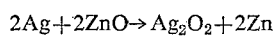

Zinc is reformed on the anode surface 12 and silver oxide on the cathode surface 15, again without any change in the electrolyte 16.

Figure 2:
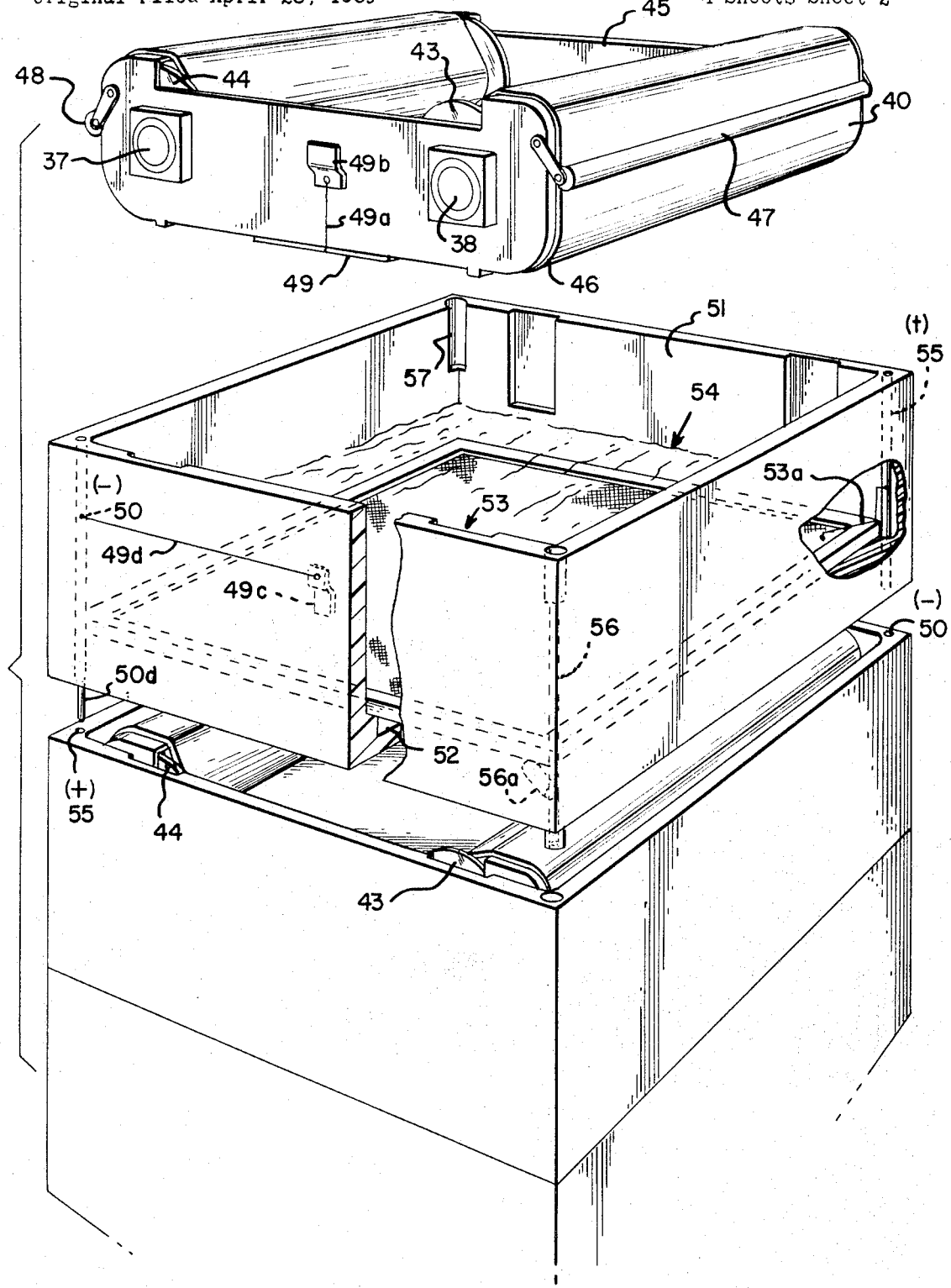
FIG. 2 is an exploded isometric view of three cells generally similar to that in FIG. 1, but wherein the anode is in the form of a movable tape and the cathode is a stationary electrode, connected in series to form a battery.

FIGS. 2 and 3: Anode movable, cathode stationary

FIGS. 2 and 3 show details of another typical rechargeable cell according to the present invention, wherein the cathode is a stationary air permeable electrode and the other components are similar to those in the cell of FIG. 1.

A movable anode 40 comprising a flexible support tape 41 of conductive material, such as steel, and a thin film 42 of active material, such as zinc, plated on the outer surface thereof, is wound on reels 43 and 44, which are rotatably mounted in the cartridge housing 45. Motors 37 and 38 or other suitable driving means, which may be mounted in the housing 45, drive the reels 43 and 44 in either direction selectively at speeds that are regulated by a servo speed control 39, as in the cell of FIG. 1. Between the reels 43 and 44 the anode tape 40 presses against a guide surface 46. Roller squeegees 47 and 48 help to guide the anode tape 40 and remove excess electrolyte from it. Electrical connection to the anode 40 is made through a conductive member 49 on the guide surface 46, which contacts the conductive supporting tape 41, and is connected by a lead 49a and a contact 49b on the cartridge housing 45 to a contact 49c and a lead 49d, in a container 51, to a rod-like connector terminal 50.

The container 51, made of plastic or other suitable insulating material, provides an air plenum 52, above which is mounted an air permeable cathode 53 which may comprise a flat screen made of conductive wire into which is pasted a mixture of powdered carbon, powdered graphite, powdered polytetrafluoroethylene, and a catalyst such as platinum or silver, all in a suitable binder. The space above the cathode 53 is filled with an aqueous electrolyte 54, which typically comprises potassium hydroxide and zinc oxide, to a level at least above the level of the anode 40. The cathode 53 is electrically connected by a lead 53a to a rod-like terminal 55. The positive terminal 55 is mounted vertically in the corner of the cell opposite the corner where the negative terminal 50 is similarly mounted. The middle cell of the three shown in FIG. 2 is the same as the upper and lower cells, except that its negative terminal 50 is located in the right rear corner of the cell and its positive terminal 55 is located in the left front corner. Cells having the right handed arrangement of terminals as shown in the upper cell may be stacked alternately with cells having the left handed arrangement as in the middle cell, to connect them in series by means of the prongs 50a. Other simple and obvious stacking arrangements and connections between cells may be used where parallel or series-parallel connections are desired.

With the cartridge 45 placed inside the container 51 as in FIG. 3, the operation of each cell is similar to that of FIG. 1 except that the cathode 53 is stationary, and is supplied with air during discharging. The air is supplied under pressure through inlet passages 56 and 56a to the air plenum 52, and passes through the cathode 53 and the electrolyte 54, forming small bubbles that pass through the electrolyte 54 and are carried away from the cell by the vent passage 57. During charging, oxygen is evolved at the cathode 53, and the plenum 52 is vented to the atmosphere through the passages 56a and 56.

During discharging, the reaction at the anode is

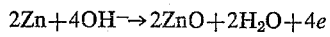
$$2Zn+4OH^- \rightarrow 2ZnO+2H_2O+4e$$

the reaction at the cathode is

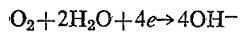
$$O_2+2H_2O+4e \rightarrow 4OH^-$$

and the overall reaction is

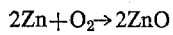
$$2Zn+O_2 \rightarrow 2ZnO$$

Here again the electrolyte remains unchanged, and hydroxyl ion migration is assisted by the excess air bubbling through the electrolyte.

During charge, the reaction at the anode is

$$4e+2ZnO+2H_2O \rightarrow 2Zn+4OH^-$$

the reaction at the cathode is

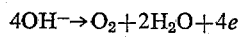
$$4OH^- \rightarrow O_2+2H_2O+4e$$

and the overall reaction is reversed:

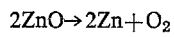
$$2ZnO \rightarrow 2Zn+O_2$$

The electrolyte is unaffected, zinc is reformed on the anode 40, and oxygen escapes to the atmosphere through the plenum 52 and the air passage 56.

Servo speed control

The servo speed control 30, as in FIG. 1, controls the speed of the tapes 10 and 13 during discharge of the cell by means of its mechanical connection 31 to the driven reels 18 and 22, and during charge by means of its mechanical connection 32 to the driven reels 17 and 21. The speed control is variable from zero to the maximum speed desired, say about 12 inches per minute. The speed is arranged to be proportional to the input commands and the output condition of the battery as determined by the load on the cell at any instant. The output condition of the cell is measured and compared with the input command signals. An error signal is thus derived and fed back to the tape drive motor to cause it to speed up or slow down as required by the instantaneous demands of the load. This is the application of conventional feedback servomechanism technology to battery output control.

This can be done only because of a unique feature of the tape battery as compared to conventional plate batteries, namely that the active area of the tape battery is a variable which can be controlled. Consider the battery cell of FIG. 1 with the tapes motionless. The active electrode areas are on the lengths of the anode and cathode tapes immersed in electrolyte times the widths of the tapes. Now apply a load to the battery cell and adjust the tape speeds so that all of the zinc converts to zinc oxide and all of the silver oxide converts to silver just as the tapes leave the electrolyte. For this particular load current we are now using the maximum available electrode area and consequently are drawing minimum current density as measured, say, in amperes per square foot. We also have maximum battery voltage for this particular load current. Now slow the tapes down to one-half their former speed. To maintain the same load current the same quantities of zinc and silver oxide have to be converted since coulombs are proportional to the weight of the reactants and the current, coulombs per second, is assumed to be the same for both speeds. Since we are now introducing the reactants at half their former rate and are converting them at the same rate, they are completely converted by the time they reach half the distance from the tape input to the electrolyte to the tape output from the electrolyte. In effect, we now have a one cell battery having only half its former active electrode area. It is this unique feature of active electrode area variable with tape speed that provides the advantage of servomechanism control of output voltage and current.

FIG. 4 shows a family of battery discharge characteristic curves 60–66 for a typical tape battery having a number of these cells in series for an open circuit output voltage of 100 volts and a maximum power transfer output of 100 amperes at 50 volts, or 5 kilowatts. Each cell has a maximum active tape area of 1 square foot and all tapes are driven in synchronism. As the active area is reduced in going from curve 60 to curve 66 the negative slope increases, as is to be expected with the increase of internal battery resistance with reduced electrode area.

A consant load line 67 for one ohm is shown on these characteristics, running from 0,0 to the area=1 sq. ft. characteristic, curve 60, at 63 volts and 63 amperes. For this constant resistance load, as the tapes are slowed down the active area is reduced, the current density increases and both the output voltage and current fall, such that at area=0.6 sq. ft. the battery output is 53 volts, 53 amperes; at area=0.3 sq. ft. it is 39 volts, 39 amperes; and at area=0.1 sq. ft. it is 19 volts, 19 amperes.

If we impose the servo speed control 30 and command it for constant voltage at 65 volts we have the operating line 68, for constant voltage control. As the load current changes with external conditions from zero to 57 amperes the servo control 30 speeds the tapes up proportionately, providing more and more active area to maintain the voltage (and the current density) constant until the maximum speed and active area characteristic curve is reached at 65 volts and 57 amperes. If the current increases beyond 57 amperes, the battery will provide it but the voltage will decrease, as in the ordinary battery, along the characteristic curve 60 until 100 amperes (the maximum allowable battery current) and 50 volts are reached.

If we command the servo control 30 for constant current at 60 amperes we get the operating line 69, running from zero volts, 60 amperes, to 64 volts, 60 amperes. As the load changes from zero resistance to larger values due to external conditions, the servo control 30 speeds up the tapes to provide the greater voltage needed to drive the same current through the larger resistance. This continues until the maximum area characteristic curve 60 is reached at 64 volts. If the resistance increases further the current will fall off and the voltage will increase along the characteristic curve 60 until zero current is reached at 100 volts. The way the servo accomplished this control is shown at 70. Starting at 60 amperes, 15 volts, the resistance increases slightly. At first the current falls off to about 58 amperes. This provides enough error signal for the servo to speed up the tapes and restore 60 amperes at 20 volts. As the resistance continues to increase, the current again falls off to about 58 amperes, the servo again speeds up the tapes and equilibrium is again established at 23 volts, 60 amperes. This action conitnues until equilibrium is established at 33 volts, 60 amperes. Actually the error signal necessary is much less than 2 amperes and the current is maintained at very nearly 60 amperes.

Another control line is shown at 71 as a rising voltage control. By servo action as described above the battery output follows this line to this intersection with the maximum characteristic curve 60 for area=1.0 sq. ft., and then follows this curve to 100 amperes. The servo speed control 30 can be built to allow selection of any of these lines or any other line on these characteristics, or even combinations of these lines such as the combination of constant voltage control 68 and constant current control 69.

This unique ability of the tape battery to have a servo controlled output characteristic curve subject to input commands can be very useful as, for instance, in the control of DC motor speed and power. This comes about because by servo control we can not only select an operating line as described above but also select by command input the particular point on the line at which we wish the equipment to operate.

When the cell is being charged, the servo speed control 30 operates in a similar manner to that described above. The command setting is adjusted to provide control responsive to the charging voltage and the current through the cell such that all of the zinc oxide of the anode 10 is converted to zinc and all of the silver of the cathode 13 is converted back to silver oxide just before the tapes emerge from the electrolyte 16 as they are driven back onto their storage reels 17 and 21. Such control provides optimum efficiency and economy in charging the cell and provides a long useful cell life.

Of course the servo speed control 39 may also be operated as described above to control the speed of the reels 44 and 43 as they drive the movable anode 40 in the cell of FIG. 3 during discharging and charging respectively.

The flexible support tapes 11, 14, and 41 in the preferred embodiments disclosed herein preferably are made of steel, as mentioned, or other material, such as carbon or graphite-cloth, that is electrochemically inert in the electrolyte of the cell, unlike the active material of the anode or cathode surface thereon. In some cells comprising acid electrolytes, steel might dissolve during discharge. In such cells another material, one that is electrochemically inert in the particular electrolyte of the cell, should be used for the tape. Whatever the electrolyte, the tape should be electrochemically inert therein, to prevent any possibility of consuming it during an accidental overdischarge, and thus leaving nothing to begin recharging on.

While the forms of the invention herein disclosed constitute presently preferred embodiments, many others are possible. It is not intended herein to mention all of the possible equivalent forms or ramifications of the invention. It is to be understood that the terms used herein are merely descriptive rather than limiting, and that various changes may be made without departing from the spirit or scope of the invention.

We claim:

1. A rechargeable current generating cell comprising: a bulk liquid electrolyte;
an anode, at least a portion of which is immersed in said electrolyte, said anode comprising a thin, flexible, movable elongated conductive member;
a stationary guide member for positioning said movable anode, said stationary guide member including an elongated surface;
a conductive member coupled to said stationary guide member for electrically contacting said anode;
a substantially planar stationary cathode, at least a portion of which is immersed in said electrolyte, said stationary cathode positioned below said stationary guide member;
said thin flexible, movable elongated conductive member including a first surface engaging said stationary guide member and a second surface opposite and closely spaced from said stationary cathode;
an electro-chemically active material coated on said second surface of said thin, flexible, movable elongated conductive member;
means for storing substantial lengths of said anode at locations away from said electrolyte and said cathode; and,
means for moving portions of said anode through said electrolyte.

2. A cell according to claim 1 wherein the cathode comprises an air permeable conductive member having catalytic material thereon.

3. A cell as in claim 2 wherein the cathode comprises a gas permeable member.

4. A cell according to claim 1 comprising also means for controlling the speed of movement of the anode.

5. A cell as in claim 4 wherein the control means continuously adjusts the speed of movement so as to provide preselected voltages across, and currents through, the cell over a range of settings of a command device.

6. A cell as in claim 5 wherein the control means includes a servomechanism.

7. A cell as in claim 4 wherein the control means is responsive to the instantaneous voltage across, or current through, the cell to maintain at least one of them substantially at values selected as a function thereof and of adjustable settings of a command device.

8. A cell as in claim 1 wherein the moving means drives the anode in one direction when the cell is being discharged and in the opposite direction when it is being charged.

9. A cell as in claim 1 wherein, with the cell in a charged state, the electrolyte is alkaline, the active anode surface consists essentially of iron, cadmium, or zinc, and the active cathode surface consists essentially of nickel oxide or silver oxide.

10. A cell according to claim 1 wherein, with the cell in a charged state, the electrolyte consists essentially of potassium hydroxide, and the active anode surface and the active cathode surface respectively consists essentially of iron and nickel oxide; cadmium and silver oxide; or zinc and silver oxide.

11. A cell according to claim 1 wherein, with the cell in a charged state, the electrolyte consists essentially of sulfuric acid, the active anode surface consists essentially of lead, and the active cathode surface consists essentially of lead oxide.

12. A cell according to claim 1 wherein, with the cell in a charged state, the active anode surface consists essentially of zinc.

13. A cell according to claim 1 wherein, with the cell in a charged state, the active anode surface consists essentially of a coating of about 5 to 25 grams per square foot of zinc.

14. A cell according to claim 13 wherein the electrolyte is an aqueous solution consisting essentially of about 30 to 45 percent potassium hydroxide saturated with zinc oxide.

15. A cell according to claim 13 wherein the flexible conductive member comprises a steel tape about 1 to 5 mils thick.

16. A cell according to claim 1 wherein the flexible conductive member consists essentially of a material that is electrochemically inert in said electrolyte.

17. A rechargeable current generating cell, as in claim 1, further comprising: an insulating housing containing said cell, said housing including means for facilitating the interconnection of a plurality of said cells.

18. A rechargeable current generating cell, as in claim 17, wherein: said housing is formed of plastic material and includes:
   an air plenum; and,
   air inlet and outlet passages communicating with said plenum.

19. A rechargeable current generating cell as in claim 17, wherein:
   said housing is rectangular in configuration; and wherein,
   said means for facilitating the interconnection of a plurality of cells includes a plurality rod-like conductor means positioned at the corners of said housing.

References Cited

UNITED STATES PATENTS

| | | |
|---|---|---|
| 3,392,057 | 7/1968 | Sakagami et al. ......136—86 A |
| 3,432,354 | 3/1969 | Jost ............... 136—86 R |
| 3,577,281 | 5/1971 | Pountney et al. .... 136—86 R |

WINSTON A. DOUGLAS, Primary Examiner

H. A. FEELEY, Assistant Examiner

U.S. Cl. X.R.

136—6, 83